J. P. WEBBER.
ANTISKIDDING DEVICE FOR AUTOTRUCKS.
APPLICATION FILED OCT. 8, 1912.

1,126,141.

Patented Jan. 26, 1915.

WITNESSES:
Howard P. King
Mildred E. Brooks

INVENTOR:
John P. Webber,
BY Russell M. Everett,
ATTORNEY.

THE NORRIS PETERS CO., PHOTO-LITHO., WASHINGTON, D. C.

UNITED STATES PATENT OFFICE.

JOHN P. WEBBER, OF NEWARK, NEW JERSEY.

ANTISKIDDING DEVICE FOR AUTOTRUCKS.

1,126,141.  Specification of Letters Patent.  Patented Jan. 26, 1915.

Application filed October 8, 1912. Serial No. 724,563.

*To all whom it may concern:*

Be it known that I, JOHN P. WEBBER, a citizen of the United States, residing at Newark, in the county of Essex and State of New Jersey, have invented certain Improvements in Antiskidding Devices for Autotrucks, of which the following is a specification.

The objects of this invention are to provide an anti-skidding device which can be firmly secured in fixed position upon a wheel so as to have no relative movement with respect thereto when the wheel is running; to provide means for securing the device upon a wheel in such immovable relation thereto; to secure simplicity of construction and cheapness of manufacture, as well as great durability and freedom from breakage in use; to enable the device to be fixed immovably upon a wheel without mutilating or injuring the same; to make the device adjustable so that it will fit different wheels; to secure such adjustability and at the same time connect the different parts so that they cannot become separated and lost, when not applied to a wheel; to utilize such adjustability to wedge the body of the device between the spokes of the wheel, and to obtain other advantages and results as may be brought out in the following description.

Figure 1:
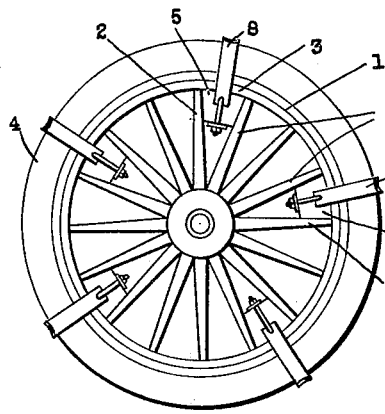
Figure 2:
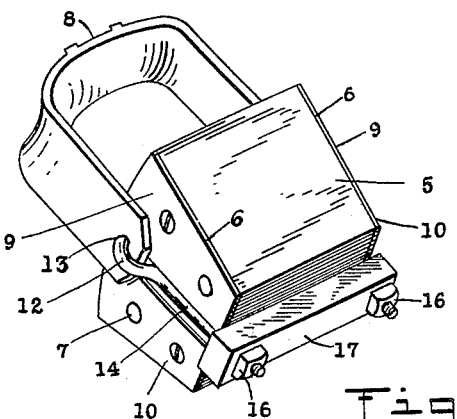
Figure 3:
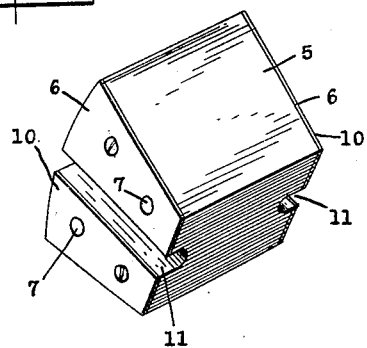
Figures 4, 5:
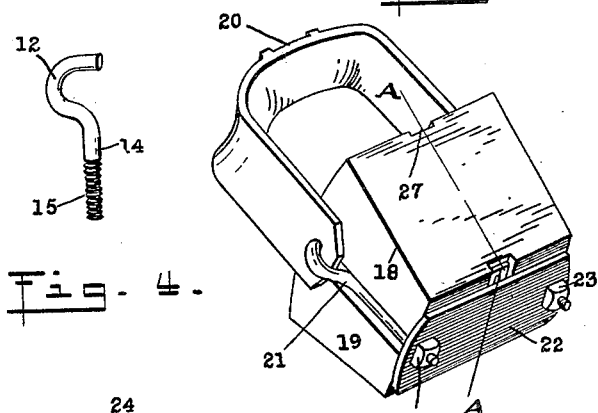
Figure 6:
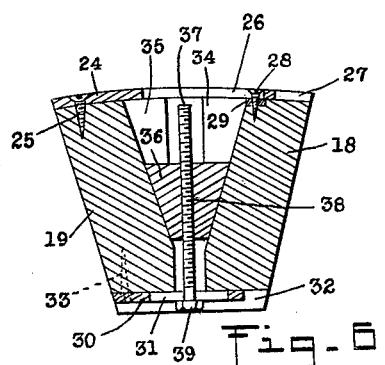
Figures 7, 8:
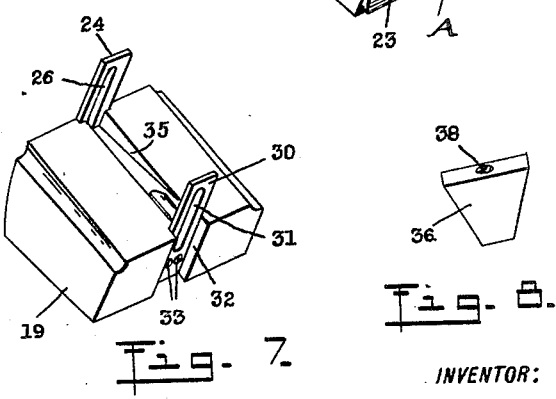

Referring to the accompanying drawings, in which like numerals of reference indicate the same parts throughout the several figures, Figure 1 is a side elevation of a wheel equipped with my improved anti-skidding device; Fig. 2 is a perspective view of one of the anti-skidding devices detached; Fig. 3 is a perspective view of the body thereof; Fig. 4 is a detail view of one of the clamping hooks; Fig. 5 is a perspective view of a modified form of one of said devices attached, which is the preferred construction; Fig. 6 is a section of the body of the same, on line A—A of Fig. 5; Fig. 7 is a perspective view of one of the adjustable sections of said body, and Fig. 8 is a perspective view of the adjusting wedge of said preferred construction.

In Figs. 1 to 4 of said drawings, 1 indicates a wheel having spokes 2, 2, and a felly 3 carrying a tire 4 which may be of solid rubber as is common. My anti-skidding device, in the specific embodiment of it illustrated in said figures, comprises a wedge-shaped block 5 adapted to fit snugly between a pair of adjacent spokes next to the felly. By virtue of the convergence of the spokes and the corresponding wedge-shape of the block 5, movement of the block radially inward toward the hub of the wheel is prevented. In fact, the spokes and felly form a pocket in which the block is retained against any material movement in the plane of the wheel, its only direction of movement being transverse to said plane of the wheel, and it is in this latter direction that the said block is inserted or removed. Said block preferably comprises a body portion of wood, which is shown in the figures now being described as of one integral piece and having upon its opposite sides or faces parallel to the plane of the wheel when the device is applied thereto, metallic plates 6, 6 securely fastened to the wooden body as for instance by rivets 7, 7 extending through said body and plates. It will be understood, however, that the said face plates are not essential to my invention, and are preferably used only to resist wear and secure greater strength; furthermore, the body of the block 5 may be of any suitable material whatever, although wood is preferred for its peculiar qualities, and as I have set forth elsewhere in this specification, said block may be sectional. With said block 5 arranged upon a wheel as described, a U-shaped band or bow 8 extends around the tire and felly with its arms lying on opposite sides of the wheel closely adjacent thereto and on opposite sides of the block, to which said arms are separably connected. In the opposite parallel faces 9, 9 of the wedge-shaped block 5, I cut grooves 11, 11, which, when the device is applied to a wheel, will be in the direction of the radius thereof. As stated, a U-shaped band 8 is adapted to slip over the block 5, the ends of the band 8 lying adjacent to the said parallel sides or faces 10, 10 of the block 5. Hooks 12, 12 engage in appropriate holes or recesses 13 at the ends of the band 8, said hooks being so bent that their shanks 14 will lie within the grooves 11 of the block. The ends of each shank 14 away from the hooked end is screw threaded as at 15, for the reception of a nut 16. Spanning the block 5, transverse to the plane of the wheel and upon the end toward the hub, is a yoke 17 through which the shanks 14 of both of the hooks project. When the device is placed on a wheel, it will be evident that by drawing up on the nuts 16, 16, the block 5 will be pressed against the felly of the wheel and the band 8 will be drawn against the tire. By continued twisting of the nuts 16, 16, the band 8 may be properly sunk into the tire, and the whole device clamped in place.

In order to make the device adjustable so as to properly fit between spokes differently spaced apart, the construction of the anti-skidding device may be as shown in Figs. 5–8. There I have shown the block composed of two sections 18 and 19, it being divided upon a plane through the axis of the wheel and the center of the block when placed in its operative position upon the wheel. The U-shaped bow or band 20 is connected to the block by means of hooks 21 passing through the yoke 22 and provided with nuts 23 similar to the construction just described. Embedded in the end of the block which normally rests or bears against the felly of the wheel, is a slotted arm 24 transverse to the plane separating the sections 18 and 19 and secured to one of the sections 19 in any suitable manner, as by screw 25. The end of said arm 24 having the slot 26 projects into an appropriate groove 27 of the opposite section 18, and suitable means are provided to slidably secure the arm 24 to the section 18, such as screw 28 passing through the slot 26 either directly into the body of the block section or preferably into a reinforcing strip 29 sunk in the section transversely of the slot and secured in any suitable manner as by screws (not shown). A similar arm 30 having a slot 31 is arranged in a groove 32 in the opposite end of the block from the first said arm 24. These arms 24 and 30 are substantially parallel, and the second said arm 30 is preferably secured to the same section 19 of the block as is the first said arm 24, by any suitable means as screws 33. The inner faces of the sections of the block which are formed by cutting the block apart are provided with tapered grooves 34, 35, extending between the arms 24 and 30, each groove being deeper at its end next adjacent to the arm 24 and tapering to less depth as it approaches the other arm, preferably to nothing as shown. The said grooves are rectangular in cross-section, and an adjusting wedge 36 between the block sections is adapted to slide in said grooves 34, 35, it being readily apparent by reference to Fig. 6 that when the wedge is slid toward the ends of less depth of the grooves 34, 35, the two sections 18, 19 of the block will be forced correspondingly apart, whereas when the wedge 36 is within the deepest portions of grooves 34, 35, the two sections 18, 19 may be brought closer together. In order to shift the wedge 36 within the slots 34, 35, as just described, I provide a bolt 37 projecting transversely through the slot 31 of the arm 30 on the small end of the block and extending longitudinally between the block sections 18, 19, and their grooves 34, 35. This bolt is appropriately threaded to screw in a longitudinal threaded socket 38 in the adjusting wedge 36, and as a head 39 on the bolt 37 overlaps the arm 30, screwing said bolt into the wedge 36 serves to draw said wedge toward the arm 30 and thus spread the block sections 18, 19. Upon unscrewing the bolt, the sections can be brought together again, and thus any desired width of block may be obtained by properly adjusting the wedge 36 through manipulation of the bolt 37. When the device is removed from a wheel, the sections 18 and 19 are retained together by means of the arms 24 and 30, and the parts of the device are therefore prevented from separating and becoming lost.

Having thus described the invention, what I claim as new is:—

1. The combination with a wheel having a rim and spokes, of an unyielding block between said rim and two adjacent spokes engaging the same to prevent movement in the plane of the wheel, said block having in its opposite sides grooves disposed radially of the wheel, a band extending around the rim across the tread of the wheel, clamping hooks lying in said grooves and engaging said band, and means for drawing said clamping hooks longitudinally of their grooves to clamp said band against the tire.

2. The combination with a wheel having a rim and spokes, of an unyielding block between said rim and two adjacent spokes engaging the same to prevent movement in the plane of the wheel, said block having in its opposite sides grooves disposed radially of the wheel, a band extending around the rim across the tread of the wheel, clamping hooks lying in said grooves and engaging at one end the said band, a yoke connecting the other ends of said clamping hooks beyond the block, and means for drawing said hooks through said yoke to clamp the band against the tire.

3. The combination with a wheel having a rim and spokes, of an unyielding block between said rim and two adjacent spokes engaging the same to prevent movement in the plane of the wheel, said block comprising sections adjustable with respect to each other to expand said block against said spokes, and means connected to said block extending around said rim across the tread of the tire for preventing slippage.

4. The combination with a wheel having a rim and spokes, of a block between said rim and two adjacent spokes comprising sections adjustable with respect to each other to expand said block against said spokes, and means connected to said block extending around said rim across the tread of the tire for preventing slippage.

5. The combination with a wheel having a rim and spokes, of a block between said rim and two adjacent spokes comprising sections divided radially of the wheel and having at their adjacent faces grooves converging toward the hub of the wheel, a wedge in said grooves, means for tightening said wedge, and means connected to said block extending around the rim of the wheel across its tread for preventing slippage.

6. The combination with a wheel having a rim and spokes, of a block between said rim and two adjacent spokes comprising sections divided radially of the wheel and having at their adjacent faces grooves converging toward the hub of the wheel, a wedge in said grooves, means for tightening said wedge, means for holding said block sections against separation, and a band connected to said block extending around the rim of the wheel across its tread.

7. The combination with a wheel having a rim and spokes, of a block between said rim and two adjacent spokes engaging the same to prevent movement in the plane of the wheel, said block comprising sections of wood adjustable with respect to each other in the plane of the wheel toward and away from said spokes, means for adjusting said sections, and a band connected to said blocks extending around the rim of the wheel across its tread.

JOHN P. WEBBER.

Witnesses:
RUSSELL M. EVERETT,
HOWARD P. KING.

Copies of this patent may be obtained for five cents each, by addressing the "Commissioner of Patents, Washington, D. C."